(12) United States Patent
Jousse et al.

(10) Patent No.: US 7,247,268 B2
(45) Date of Patent: Jul. 24, 2007

(54) METHOD FOR MAKING A PART WITH CLEARANCE VOLUME BY ROTATIONAL MOULDING AND RESULTING PART

(75) Inventors: Franck Jousse, Tours (FR); Philippe Mazabraud, Orleans (FR); Abbas Tcharkhtchi, L'Hay-les-Roses (FR); Mark Kearns, Co. Down (IE)

(73) Assignee: Commissariat a l'Energie Atomique, Paris (FR)

( * ) Notice: Subject to any disclaimer, the term of this patent is extended or adjusted under 35 U.S.C. 154(b) by 424 days.

(21) Appl. No.: 10/344,558

(22) PCT Filed: Aug. 27, 2001

(86) PCT No.: PCT/FR01/02676

§ 371 (c)(1),
(2), (4) Date: Feb. 20, 2003

(87) PCT Pub. No.: WO02/18117

PCT Pub. Date: Mar. 7, 2002

(65) Prior Publication Data

US 2003/0161981 A1    Aug. 28, 2003

(30) Foreign Application Priority Data

Aug. 30, 2000  (FR) ................... 00 11072

(51) Int. Cl.
*B28B 1/20*    (2006.01)
(52) U.S. Cl. ............. 264/311; 264/310; 264/255; 156/74

(58) Field of Classification Search ............ 264/255, 264/310, 311; 156/74, 184, 242, 243, 244.13; 428/36.91, 35.7, 36.6, 36.7
See application file for complete search history.

(56) References Cited

U.S. PATENT DOCUMENTS

| | | | |
|---|---|---|---|
| 4,451,512 A * | 5/1984 | Yazaki et al. | 428/36.6 |
| 4,535,901 A * | 8/1985 | Okudaira et al. | 215/12.2 |
| 4,810,542 A * | 3/1989 | Kawai et al. | 428/36.7 |
| 5,171,346 A | 12/1992 | Hallett | |
| 5,320,889 A * | 6/1994 | Bettle, III | 428/36.6 |
| 5,567,296 A | 10/1996 | Luch | |
| 6,068,933 A * | 5/2000 | Shepard et al. | 428/474.4 |

FOREIGN PATENT DOCUMENTS

| | | |
|---|---|---|
| EP | 0 518 354 | 12/1992 |
| FR | 1 604 824 | 4/1972 |
| FR | 2 776 228 | 9/1999 |
| JP | 403002009 A * | 1/1991 |

* cited by examiner

*Primary Examiner*—Michael C. Miggins
(74) *Attorney, Agent, or Firm*—Oblon, Spivak, McClelland, Maier & Neustadt, P.C.

(57) ABSTRACT

A cylindrical element is manufactured by a process which includes depositing successive layers of thermoplastic materials in a cycle by rotation moulding, or by a technique enabling a deposit of successive layers, the cycle including at least one deposit by rotation moulding or by a technique enabling deposit of successive layers at a temperature from 170 to 240° C. The cylindrical element contains at least one layer containing an ethylene-vinyl alcohol copolymer with a density at the above temperature of between 0.94 and 1.4, and a melt flow index of between 1.3 and 4.2 g/10 minutes.

40 Claims, 2 Drawing Sheets

Figure 1:
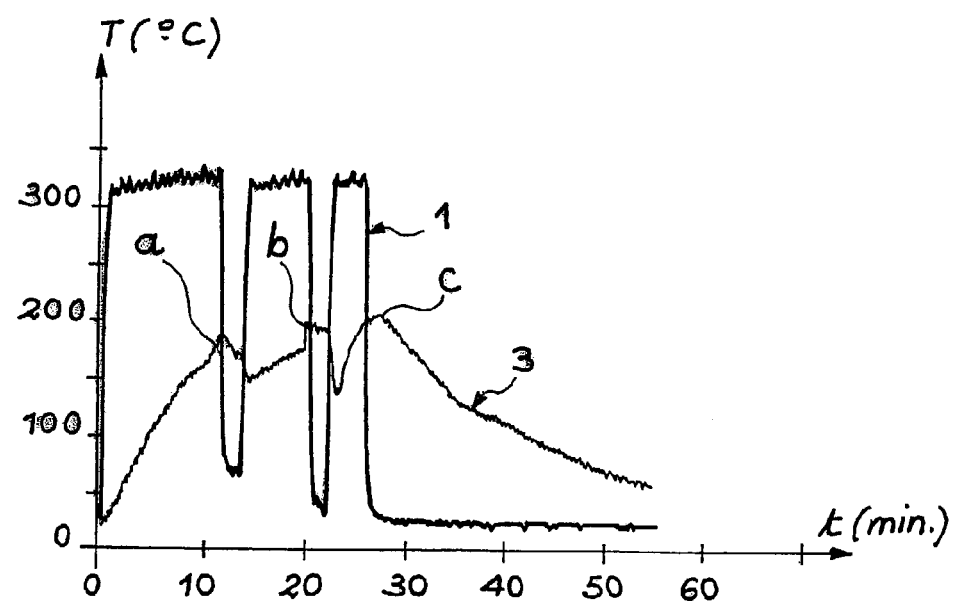

METHOD FOR MAKING A PART WITH CLEARANCE VOLUME BY ROTATIONAL MOULDING AND RESULTING PART

TECHNICAL DOMAIN

This invention relates to a process for making a cylindrical element by rotation moulding and a element obtained by the said process.

This invention is particularly but not exclusively applicable to the manufacture of seamless plastic elements or structures of revolution with multiple layers.

A structure or cylindrical element means a structure defining a dead volume, for example so as to form a cylinder or a container such as a tank, a canister, a tank, a vat, etc.

Rotation moulding is used for making hollow elements made of plastic materials. It is an economic technique used particularly for making elements in small production series.

In rotation moulding processes, the material put in fusion moves under the effect of gravity in a mould rotating in a furnace. Therefore, the rotation moulded material needs to have a particular physicochemical behaviour and morphology which explains the restricted range of materials that can be rotation moulded present on the market at the moment.

For storage applications, for example such as a gas tank, seamless and homogeneous structures of revolution can be obtained with improved properties such as permeability to gas, mechanical strength, resistance to irradiation, solvents, etc.

STATE OF PRIOR ART

Existing rotation moulding protocols essentially use materials such as polyethylene, polyvinyl chlorides, polyamides, polyurethanes, vinyl acetate copolymers and polystyrenes. These protocols recommend the use of grades of these thermoplastic polymers with a fairly low viscosity and a density of between 0.924 and 0.939 and a melt flow index of between 3 and 9 g/10 minutes. The grade is a commercial name; there may be several commercial grades for a polymer, in other words with different crystallinity or different masses or different chain lengths, etc.

Rotation moulding of multiple layers in industry essentially concerns polyethylene/polyethylene or polyethylene/polyurethane foam/polyethylene type structures.

Thermoplastics more for engineering purposes, and particularly thermoplastics in the ethylene-vinyl alcohol copolymers family have never been rotation moulded. These copolymers were actually used by injection or extrusion for applications in packaging, for example as gas barrier materials, in food processing or cosmetics. Thin values were used in these applications, less than 500 μm.

PRESENTATION OF THE INVENTION

The purpose of this invention is precisely to provide a process for making a cylindrical element comprising a cycle of successive deposits of thermoplastic material layers by rotation moulding, or by a technique enabling deposit of successive layers, the said cycle comprising at least one deposit by rotation moulding, or by the technique enabling deposit of successive layers at a temperature of 170 to 240° C., for example from 180 to 230° C., a layer composed of an ethylene-vinyl alcohol copolymer with a density at this temperature of between 0.94 and 1.4, for example between 1.10 and 1.22 and a melt flow index between 1.3 and 4.2 g/10 minutes, for example between 1.5 and 4 g/10 minutes.

According to the invention, the ethylene-vinyl alcohol copolymer may also be defined as having the following formula:

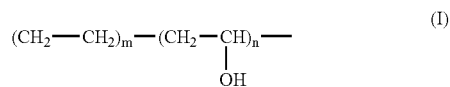

$$(CH_2-CH_2)_m-(CH_2-CH)_n- \atop |\atop OH \qquad (I)$$

where m is between 10 and 80% in moles in the polymer, or between 20 and 80% in moles.

The melt flow index of the ethylene-vinyl alcohol copolymer is determined according to the ASTM D 1238-88 standard using a test carried out on a Kayeness Galaxy 1 machine (trademark) model 7053 DE made by the Kayeness Inc. company, Morgantown, Pa. 19543. This test consists of placing a polymer filler on a tube placed at a defined temperature, greater than the polymer melting temperature, and measuring the polymer quantity that flows during 30 seconds. This time is then converted into minutes.

EVOH polymers are thermoplastics with good mechanical properties forming a very good barrier to gases. These properties are particularly attractive if the EVOH layer that can be obtained using the process according to this invention is thick.

EVOH polymers are usually commercially available in the form of pellets. Preferably, the commercial pellets are previously micronized into a powder, for example at ambient temperature or cryogenic temperature, and the size grading is chosen depending on the nature of the polymers and the envisaged multi-layer structure, preferably shaving a size grading smaller than 0.7 mm, and advantageously between 0.1 and 0.7 mm. This micronization avoids the need to heat the EVOH excessively to melt it afterwards, while providing a homogenous layer.

Furthermore, the EVOH grade chosen according to this invention preferably has a lower melt flow index, in other words greater viscosity, than that of thermoplastics such as PE, PVC, PA that are normally rotation moulded. In other words, according to the invention, EVOH remains very viscous in the molten state so that it can be rotation moulded with thicknesses of more than 0.5 millimeters, which is contrary to the requirements in normal rotation moulding protocols in which fairly fluid thermoplastic grades are usually required.

The EVOH thermoplastic absorbs a lot of water which reduces its mechanical, rheological and gas barrier properties. Thus, rotation moulding of multi-layer structures according to this invention is preferred in order to protect the EVOH from water, for example by means of other layers of water resistant thermoplastic materials. This was not done in prior art since rheological characteristics such as viscosity, fluidity, etc., and physicochemical characteristics such as fusion, polarity, degradation temperature, etc. of the layers of thermoplastic materials other than EVOH used in prior art for rotation moulding are sometime very different from each other.

This invention overcomes this problem, particularly by the selection of an appropriate grade of EVOH which remains viscous in the molten state through its micronization, and by the choice of its application temperature which is slightly higher than its melting temperature. This gives a thick layer of EVOH and prevents thermoplastic material layers other than EVOH that are adjacent to it from mixing with it.

This invention also has the advantage that multiple layers can be rotation moulded or deposited without it being necessary to reduce the equipment temperature during application of the various layers of thermoplastic materials. Thus for example, unlike the state of the art, the temperature of an internal thermoplastic layer, in other words the final layer made by rotation moulding, may be greater than the temperature of the external layer of thermoplastic material, in other words the first layer made, without any interpenetration of the layers.

Therefore, this invention is used particularly to obtain seamless and homogeneous structures of revolution by rotation moulding with improved properties such as permeability to gas, mechanical strength, resistance to irradiation, solvents etc. Therefore, it provides a process for making a cylindrical element and the element obtained by this process that is perfectly suitable for storage applications such as tanks for solvents, hydrocarbons or gases such as pressurized hydrogen or oxygen, etc.

According to the invention, the layer composed of an ethylene-vinyl alcohol copolymer may for example be deposited between a deposit of a layer of thermoplastic material A and a deposit of a layer of thermoplastic material B, A and B being usable in rotation moulding, or in the technique enabling a deposit of successive layers that may be identical or different, and are not ethylene-vinyl alcohol copolymers.

According to the invention, thermoplastic materials deposited in layers other than the ethylene-vinyl alcohol copolymer, in other words the thermoplastic materials A and B, may be chosen to be identical or different, for example in a group comprising a polyethylene (PE), a grafted polyethylene (PEG), a polyethylene terephthalate (PET), a polypropylene (PP), a polyetheretherketone (PEEK), a polycarbonate (PC), an ethylene vinyl acetate (EVA) copolymer, a polystyrene (PS), a polyvinylidene fluoride (PVDF), an amide polyester, or a polyamide (PA), a polyarylamide (PAA) or a mix of these thermoplastic materials.

The process according to this invention can be used to obtain a cylindrical element.

According to one embodiment of this invention, the cylindrical element may for example comprise in sequence a layer of polyamide, a layer of ethylene-vinyl alcohol copolymer, and a layer of grafted polyethylene.

According to another embodiment of this invention, the cylindrical element may for example comprise in sequence a first layer of polyamide, a layer of ethylene-vinyl alcohol copolymer and a second layer of polyamide, the layers of polyamide being identical or different.

The thickness of each layer of material may be adjusted with the quantity of polymer powder introduced taking account of the shape of the mould, the surface of the mould to be covered and the thickness of the required layer.

According to the invention, the thickness of the EVOH layer may be selected for example so as to improve the properties of the material depending on the envisaged applications as a function of the cost, weight, mechanical strength, gas barrier properties, etc. This layer, composed of the ethylene-vinyl alcohol copolymer, may for example be deposited with a thickness of between 0.3 and 20 mm, preferably between 0.5 and 10 mm, and even better between 0.5 and 5 mm, although these example thicknesses are not limitative.

According to the invention, the thermoplastic materials other than the ethylene-vinyl alcohol copolymer deposited for example by rotation moulding, may be deposited in sufficient thicknesses for the intended use of the manufactured element, for example with a thickness of between 0.1 and 10 mm, preferably between 0.1 and 5 mm, although these example thicknesses are not limitative.

The technique used to deposit successive layers according to this invention may for example be a moulding technique, cold plasma projection, co-blowing, co-injection, co-extrusion, etc.

Thermoplastic materials, EVOH and others, may possibly be filled with organic or mineral fillers, for example in order to improve the mechanical strength, resistance to aging or to facilitate use.

The cylindrical element according to this invention may also comprise a stiffening structure, such as a structure of carbon wires impregnated with a thermally cross-linked resin. The process can then also include a layup or weaving step for this stiffening structure on the cylindrical element.

The process according to this invention may for example be made using the following protocol:

The powder of a first thermoplastic or thermoplastic A, different from an EVOH, for example forming the first layer deposited by rotation moulding, is added into the equipment mould which is then rotated and placed in a preheated furnace at a fixed temperature of about 200° C.

The rotating mould is left in the furnace for an appropriate time until the internal air temperature reaches an appropriate value between the melting temperature Tf of the first polymer and 280° C., depending on the nature of the thermoplastic.

The rotating mould is then taken out from the furnace and is cooled for an appropriate time until the air temperature inside the mould reaches a defined value, for example between 280° C. and 130° C. depending on the nature of the first thermoplastic.

The EVOH thermoplastic may then be continuously or non-continuously introduced into the rotating mould that is then put back into the hot furnace. The grade of the EVOH acting as a gas barrier is selected so that it has a high viscosity in the molten state, in other words as defined according to this invention. As soon as the air temperature inside the mould reaches a value slightly higher than the melting temperature of the EVOH, in other words for example from 185° C. to 200° C., and in general at a temperature of up to 50° C. above the melting temperature of EVOH, the rotating mould is taken out of the furnace and is cooled for an appropriate time until the air temperature inside the mould reaches a defined value, for example between 200° C. and 150° C. depending on the nature of the third polymer to be added.

The powder for a second thermoplastic or thermoplastic B, other than an EVOH, can then be added continuously or discontinuously into the rotating mould which is then put back into the hot furnace and the procedure begins again as described for the first point above, depending on the envisaged multi-layer structure. Unlike multi-layers obtained by rotation moulding according to prior art, the application temperature of this layer may be greater than the application temperature of the previous layers due to the strong viscosity and thickness of the EVOH specific to this invention.

The mould heating, withdrawal and cooling time and temperature parameters for each layer are defined as a function of the nature of the thermoplastic used. These parameters, and the biaxial rotation speeds of the mould, the nature of the mould for example made of steel, stainless steel, PTFE, etc., are some factors used to adjust the viscosity of the molten layer of polymers and to facilitate the escape of any bubbles trapped in it.

In general, according to the invention, the application times of the successive layers is preferably shorter and shorter if possible, to avoid degrading the previous layers.

According to this invention, the layer of EVOH may be used at a temperature slightly higher than its melting temperature, up to 230/240° C. with a thickness that can be more than 0.5 mm which is innovative compared with the state of the art. This means that thermoplastic layers can be stacked on the EVOH layer regardless of their melting and/or application temperatures, whereas the state of the art recommends that the application temperature of subsequent layers should be reduced to prevent interpenetration of the layers.

According to the invention, the use of a low pressure of the order of a few hectopascals and/or an inert gas, for example nitrogen, can facilitate the manufacture of multilayer structures as a function of the nature and stacking of the thermoplastic layers.

Therefore, there are many applications of this invention and some apart from those mentioned above include fuel cells resisting pressures of 200 to 600×$10^5$ Pa, H2 tank applications for fuel cells in which the tank may be subjected to temperatures varying from −40 to 160° C.

Apart from the advantages mentioned above, the process according to this invention and the cylindrical element obtained can be used to make lighter weight tanks than in prior art, and can reduce manufacturing costs and increase the life of the manufactured tanks.

Other characteristics and advantages will become clear after reading the following examples given for illustrative purposes and in no way limitative, with reference to the attached figures.

FIGURES

FIG. 1 is a graphic view of the temperature variation of a temperature sensor placed on the outside of the rotation moulding mould and the temperature of the atmosphere inside the rotation moulding furnace, as a function of the time in minutes during manufacture of a three-layer cylindrical element made of 1 mm polyamide PA12/2 mm ethylene vinyl alcohol/1 mm grafted polyethylene, using the process according to this invention.

Figure 2:
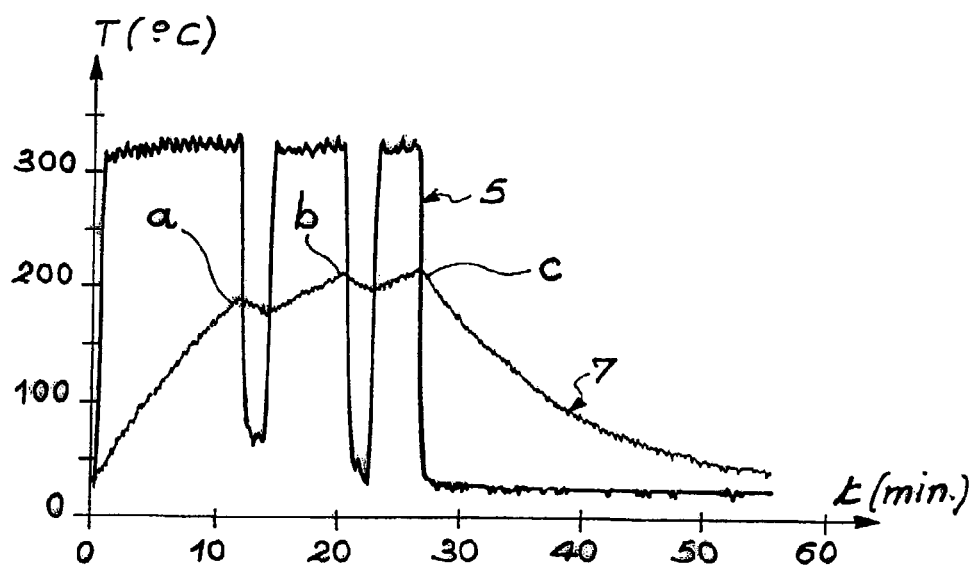

FIG. 2 is a graphic view of the temperature variation of a temperature sensor placed on the outside of the rotation moulding mould and the temperature of the atmosphere inside the rotation moulding furnace, as a function of the time in minutes during manufacture of a three-layer cylindrical element made of 1 mm grafted polyethylene/3 mm ethylene-vinyl alcohol/1 mm polyamide PA12, using the process according to this invention.

Figure 3:
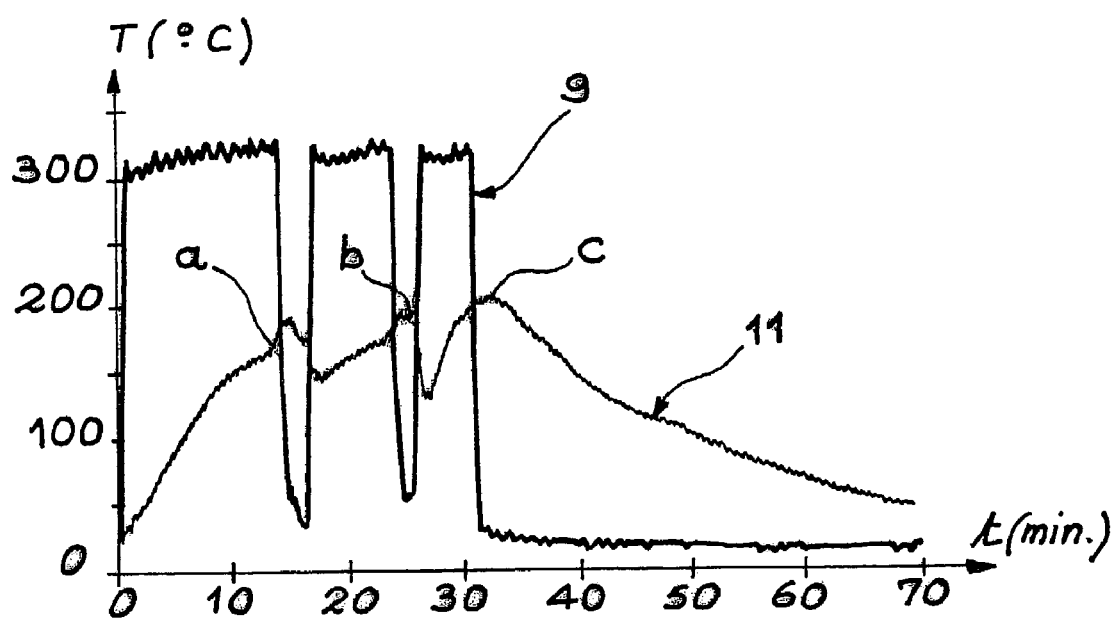

FIG. 3 is a graphic view of the temperature variation of a temperature sensor placed on the outside of the rotation moulding mould and the temperature of the atmosphere inside the rotation moulding furnace, as a function of the time in minutes during manufacture of a three-layer cylindrical element made of 1 mm polyamide PA12/2 mm ethylene vinyl alcohol/3 mm polyamide PA6, using the process according to this invention.

EXAMPLES

Example 1

A three-layer cylindrical element composed of a 1 mm thick outer layer made of polyamide 12 (PA12) RISLAN (trademark) commercial grade ARVO 950 TLD made by the TOTAL-FINA-ELF company, a 2 mm thick intermediate (inner) layer made of ethylene-vinyl alcohol copolymer (EVOH) SOARNOL (trademark) commercial grade D 2908 made by the NIPPON GOHSEI company, and a 1 mm thick inner layer of grafted polyethylene (grafted PE) OREVAC (trademark), commercial grade 18350 P made by the TOTAL-FINA-ELF company, was made by rotation moulding according to this invention.

The theoretical melting temperatures for these three thermoplastics are $T_{PA12}$=170° C., $T_{EVOH}$=180° C. and $T_{grafted\ PE}$=130° C., respectively.

The main parameters in terms of cycle time and temperature used are shown in FIG. 1 attached. This is a graphic view of the temperature variation of a temperature sensor placed on the outside of the rotation moulding mould, curve 1, and the temperature of the atmosphere inside the rotation moulding furnace, curve 2, as a function of the time in minutes during manufacturing of the cylindrical element according to this invention. On this figure, the temperature increases a), b) and c) correspond to the first, second (EVOH) and third layers of thermoplastic polymers, respectively.

The successive application temperatures for the different layers are 180° C., 190° C. and 200° C. Although the first layer of PA12 melts again at 200° C., there is no interpenetration with the EVOH layer since although it is also melted, it remains very viscous and thick at 200° C. Although the melting temperature of the grafted PE is about 130° C., it has to be applied at high temperature, in other words at a temperature of more than 180° C., in this case 200° C., to eliminate the bubbles formed.

Chemical bonding between the three layers is possible by selection of three polar polymers that ensure good mechanical resistance of the assembly.

EVOH pellets were micronized in advance using a WEDCO type equipment (trademark) to make a 400-micron powder that was then dried.

The biaxial rotation speed of the rotation moulder is 5.4 rpm for the primary shaft and 7.3 rpm for the secondary shaft. The mould used is made of aluminium, and the internal surface is coated with Teflon (trademark). The rotation moulder used is of the CACCIA type (trademark) equipped with a gas furnace and the ROTOLOG software (trademark).

Example 2

A structure composed of a three-layer, in this example comprising a 1 mm thick outer layer made of grafted polyethylene (grafted PE) OREVAC (trademark) commercial grade 18350 P made by the TOTAL-FINA-ELF company, a 3 mm thick intermediate (inner) layer of ethylene-vinyl alcohol copolymer (EVOH) SOARNOL (trademark) commercial grade D 2908 made by the NIPPON GOHSEI company, and a 1 mm thick layer of polyamide 12 (PA 12) RISLAN (trademark) commercial grade ARVO 950 TLD made by the TOTAL-FINA-ELF company, was obtained by rotation moulding according to this invention.

The main cycle time and temperature parameters used are shown on FIG. 2 attached. This is a graphic view of the temperature variation of a temperature sensor placed on the outside of the rotation moulding mould and the temperature of the atmosphere inside the rotation moulding furnace in ° C. as a function of the time in minutes during manufacturing of the three-layer cylindrical element. On this figure, the temperature increases a), b) and c) correspond to the first, second (EVOH) and third layers of the thermoplastic polymers respectively.

The successive layer application temperatures are 190° C., 200° C. and 205° C. respectively.

Although the first grafted PE layer melted at 205° C., there is no interpenetration with the EVOH layer since the EVOH layer, although also molten, remains very viscous at 205° C. and thick. The EVOH pellets were previously micronized using a WEDCO type equipment (trademark) into a 300-micron powder which was then dried. The biaxial rotation speed of the rotation moulder is 6.2 rpm for the primary shaft and 8.5 rpm for the secondary shaft. The mould used is made of aluminium and the inner surface is covered with Teflon (registered trademark). The rotation moulder used is of the CACCIA type (trademark) equipped with a gas furnace and the ROTOLOG software (registered trademark).

Example 3

A structure composed of a three-layer, in this example comprising a 1 mm thick outer layer made of polyamide 12 (PA 12) RISLAN (trademark) commercial grade ARVO 950 TLD made by the TOTAL-FINA-ELF company, a 2 mm thick intermediate (inner) layer made of ethylene-vinyl alcohol copolymer (EVOH) SOARNOL (trademark) commercial grade D 2908 made by the NIPPON GOHSEI company, and a 3 mm thick inner layer of polyamide 6 (PA 6) ORGALLOY (trademark) commercial grade LE 6000 made by the TOTAL-FINA-ELF company was obtained by rotation moulding according to this invention.

The main cycle time and temperature parameters used are shown on FIG. 3 attached. This is a graphic view of the temperature variation of a temperature sensor placed on the outside of the rotation moulding mould and the temperature of the atmosphere inside the rotation moulding furnace in ° C. as a function of the time in minutes during manufacturing of the three-layer cylindrical element. On this figure, the temperature increases a), b) and c) correspond to the first, second (EVOH) and third layers of the thermoplastic polymers respectively.

The successive layer application temperatures are 190° C., 190° C. and 210° C. respectively.

The three-layer cylindrical element obtained has the same qualities as obtained for the examples 1 and 2 described above.

The invention claimed is:

1. A manufacturing process for a cylindrical element, comprising:
    depositing successive layers of thermoplastic materials in a cycle by rotation moulding, or by a technique enabling a deposit of successive layers,
    said cycle comprising at least one deposit by rotation moulding or by a technique enabling deposit of successive layers at a temperature from 170 to 240° C.,
    wherein said cylindrical element comprises at least one layer comprising an ethylene-vinyl alcohol copolymer with a density at said temperature of between 0.94 and 1.4, and a melt flow index of between 1.3 and 4.2 g/10 minutes;
    wherein at least one of the layers comprising ethylene-vinyl alcohol copolymer has a thickness of more than 0.5 mm.

2. The process according to claim 1, in which the layer comprising an ethylene-vinyl alcohol copolymer is deposited between a deposit of a layer of thermoplastic material A and a deposit of a layer of thermoplastic material B,
    wherein A and B are usable in rotation moulding, or in the technique enabling a deposit of successive layers that may be identical or different, and
    wherein A and B are not ethylene-vinyl alcohol copolymers.

3. The process according to claim 1, in which the thermoplastic materials deposited in layers other than the ethylene-vinyl alcohol copolymer are selected from the group consisting of a polyethylene, a grafted polyethylene, a polyethylene terephthalate, a polypropylene, a polyetheretherketone, a polycarbonate, an ethylene vinyl acetate copolymer, a polystyrene, a polyvinylidene fluoride, an amide polyester, a polyamide, a polyarylamide, and mixtures thereof.

4. The process according to claim 2, in which the thermoplastic materials deposited in layers other than the ethylene-vinyl alcohol copolymer are selected from the group consisting of a polyethylene, a grafted polyethylene, a polyethylene terephthalate, a polypropylene, a polyetheretherketone, a polycarbonate, an ethylene vinyl acetate copolymer, a polystyrene, a polyvinylidene fluoride, an amide polyester, a polyamide, a polyarylamide, and mixtures thereof.

5. The process according to claim 1, in which a layer comprising the ethylene-vinyl alcohol copolymer is deposited with a thickness of between 0.3 and 20 mm.

6. The process according to claim 2, in which a layer comprising the ethylene-vinyl alcohol copolymer is deposited with a thickness of between 0.3 and 20 mm.

7. The process according to claim 1, in which the thermoplastic materials other than ethylene-vinyl alcohol copolymer are deposited by rotation moulding with a thickness of between 0.1 mm and 10 mm.

8. The process according to claim 2, in which the thermoplastic materials other than ethylene-vinyl alcohol copolymer are deposited by rotation moulding with a thickness of between 0.1 mm and 10 mm.

9. The process according to claim 1, in which the layer of ethylene-vinyl alcohol copolymer is deposited by rotation moulding, or by the technique enabling a deposit of layers starting from a powder of this polymer with a size grading of less than 0.7 mm.

10. The process according to claim 2, in which the layer of ethylene-vinyl alcohol copolymer is deposited by rotation moulding, or by the technique enabling a deposit of layers starting from a powder of this polymer with a size grading of less than 0.7 mm.

11. A cylindrical element obtained by a process according to claim 1.

12. A cylindrical element obtained by a process according to claim 2.

13. A cylindrical element obtained by a process according to claim 3.

14. A cylindrical element obtained by a process according to claim 4.

15. A cylindrical element obtained by a process according to claim 5.

16. A cylindrical element obtained by a process according to claim 6.

17. A cylindrical element obtained by a process according to claim 7.

18. A cylindrical element obtained by a process according to claim 8.

19. A cylindrical element obtained by a process according to claim 9.

20. A cylindrical element obtained by a process according to claim 10.

21. A cylindrical element according to claim 11, comprising in sequence a layer of polyamide, a layer of ethylene-vinyl alcohol copolymer and a layer of grafted polyethylene.

22. A cylindrical element according to claim 11, comprising in sequence a first layer of polyamide, a layer of ethylene-vinyl alcohol copolymer and a second layer of polyamide, the layers of polyamide being identical or different.

23. A cylindrical element according to claim 12, comprising in sequence a layer of polyamide, a layer of ethylene-vinyl alcohol copolymer and a layer of grafted polyethylene.

24. A cylindrical element according to claim 13, comprising in sequence a layer of polyamide, a layer of ethylene-vinyl alcohol copolymer and a layer of grafted polyethylene.

25. A cylindrical element according to claim 14, comprising in sequence a layer of polyamide, a layer of ethylene-vinyl alcohol copolymer and a layer of grafted polyethylene.

26. A cylindrical element according to claim 15, comprising in sequence a layer of polyamide, a layer of ethylene-vinyl alcohol copolymer and a layer of grafted polyethylene.

27. A cylindrical element according to claim 16, comprising in sequence a layer of polyamide, a layer of ethylene-vinyl alcohol copolymer and a layer of grafted polyethylene.

28. A cylindrical element according to claim 17, comprising in sequence a layer of polyamide, a layer of ethylene-vinyl alcohol copolymer and a layer of grafted polyethylene.

29. A cylindrical element according to claim 18, comprising in sequence a layer of polyamide, a layer of ethylene-vinyl alcohol copolymer and a layer of grafted polyethylene.

30. A cylindrical element according to claim 19, comprising in sequence a layer of polyamide, a layer of ethylene-vinyl alcohol copolymer and a layer of grafted polyethylene.

31. A cylindrical element according to claim 20, comprising in sequence a layer of polyamide, a layer of ethylene-vinyl alcohol copolymer and a layer of grafted polyethylene.

32. A cylindrical element according to claim 12, comprising in sequence a first layer of polyamide, a layer of ethylene-vinyl alcohol copolymer and a second layer of polyamide, the layers of polyamide being identical or different.

33. A cylindrical element according to claim 13, comprising in sequence a first layer of polyamide, a layer of ethylene-vinyl alcohol copolymer and a second layer of polyamide, the layers of polyamide being identical or different.

34. A cylindrical element according to claim 14, comprising in sequence a first layer of polyamide, a layer of ethylene-vinyl alcohol copolymer and a second layer of polyamide, the layers of polyamide being identical or different.

35. A cylindrical element according to claim 15, comprising in sequence a first layer of polyamide, a layer of ethylene-vinyl alcohol copolymer and a second layer of polyamide, the layers of polyamide being identical or different.

36. A cylindrical element according to claim 16, comprising in sequence a first layer of polyamide, a layer of ethylene-vinyl alcohol copolymer and a second layer of polyamide, the layers of polyamide being identical or different.

37. A cylindrical element according to claim 17, comprising in sequence a first layer of polyamide, a layer of ethylene-vinyl alcohol copolymer and a second layer of polyamide, the layers of polyamide being identical or different.

38. A cylindrical element according to claim 18, comprising in sequence a first layer of polyamide, a layer of ethylene-vinyl alcohol copolymer and a second layer of polyamide, the layers of polyamide being identical or different.

39. A cylindrical element according to claim 19, comprising in sequence a first layer of polyamide, a layer of ethylene-vinyl alcohol copolymer and a second layer of polyamide, the layers of polyamide being identical or different.

40. A cylindrical element according to claim 20, comprising in sequence a first layer of polyamide, a layer of ethylene-vinyl alcohol copolymer and a second layer of polyamide, the layers of polyamide being identical or different.

\* \* \* \* \*